United States Patent [19]

Katagiri et al.

[11] Patent Number: 5,011,394
[45] Date of Patent: Apr. 30, 1991

[54] MOLD FOR SKIN COVERED FOAMED PLASTIC MOLDING

[75] Inventors: Hiroyuki Katagiri; Hisayoshi Mizuno; Masami Mori, all of Ayase, Japan

[73] Assignee: Ikeda Bussan Co., Ltd., Kanagawa, Japan

[21] Appl. No.: 329,578

[22] Filed: Mar. 28, 1989

[30] Foreign Application Priority Data

Nov. 29, 1988 [JP] Japan .................................. 63-301812

[51] Int. Cl.⁵ .................. B29C 39/10; B29C 45/14
[52] U.S. Cl. ...................... 425/117; 249/83; 249/175; 264/46.4; 425/129.1; 425/447; 425/817 R
[58] Field of Search ............ 425/4 R, 817 R, 543, 425/559, 560, 579, 117, 129.1, 145, 447, 387.1, 388; 264/46.4, 46.6, 46.7, 46.8, 45.3, 46.9, 45.1, DIG. 10; 249/175, 83

[56] References Cited

U.S. PATENT DOCUMENTS

| | | | |
|---|---|---|---|
| 4,240,999 | 12/1980 | Decker | 425/817 R |
| 4,313,909 | 2/1982 | Boden et al. | 425/817 R |
| 4,412,962 | 11/1983 | Bessette et al. | 425/4 R |
| 4,618,466 | 10/1986 | McGlashen et al. | 425/129.1 |
| 4,824,070 | 4/1989 | Mizuno et al. | 264/46.4 |
| 4,829,644 | 5/1989 | Kondo et al. | 264/46.6 |

FOREIGN PATENT DOCUMENTS

| | | | |
|---|---|---|---|
| 59-83632 | 5/1984 | Japan | 264/46.7 |
| 60-49905 | 3/1985 | Japan | 264/46.6 |
| 63-1512 | 1/1988 | Japan | 264/46.7 |

*Primary Examiner*—Jay H. Woo
*Assistant Examiner*—James P. Mackey
*Attorney, Agent, or Firm*—Weiser & Stapler

[57] ABSTRACT

A mold for skin covered foamed plastic molding which utilizes a middle mold to be placed between an upper mold and a lower mold capable of preventing penetration of the liquid foam resin to be poured onto the skin cover, and also capable of improving the efficiency of the manufacturing process. The mold includes a middle mold configured for reducing pressure exerted by the liquid foam resin falling on the skin cover.

6 Claims, 3 Drawing Sheets

MOLD FOR SKIN COVERED FOAMED PLASTIC MOLDING

BACKGROUND OF THE INVENTION

1. Field of the Invention

The present invention relates to a mold for foamed plastic molding suitable for molding foamed plastic articles such as to be used for car seat cushions and seat backs in conjunction with skin covers and, more particularly, to such a skin covered foamed plastic molding which utilizes a middle mold between an upper mold and a lower mold.

2. Description of the Background Art

The skin covered foamed plastic has been used for car seat cushions, car seat backs, and car seat heat rests. A mold for manufacturing such a skin covered foamed plastic comprises a pair of an upper mold and a lower mold, and is designed such that in addition a middle mold may be used in between the upper mold and the lower mold.

In manufacturing with such a mold, a skin cover is placed on top of an inner surface of the lower mold over which liquid foam resin is poured, and with the upper mold placed on top of the lower mold the liquid foam resin is foamed and stiffened to become the pad and at the same time combining of the skin cover and the pad is achieved.

Now, when pouring the liquid foam resin, care must be taken to avoid the penetration of the liquid foam resin through the skin cover. This has conventionally been done by providing a target plate which the liquid foam resin hits first so that the liquid foam resin does not fall intensively on any single portion of the skin cover.

However, the use of the target plate calls for manual operation by an operator which suppresses the efficiency of the manufacturing process. Moreover, even with such a target plate some scattered penetration appears on sites to which the foam resin had been scattered by the target plate during the time of foaming of the liquid foam resin.

SUMMARY OF THE INVENTION

It is therefore an object of the present invention to provide a mold for skin covered foamed plastic molding which utilizes a middle mold to be placed between an upper mold and a lower mold, capable of preventing penetration of the liquid foam resin to be poured onto the skin cover, and also capable of improving the efficiency of the manufacturing process.

This object of the present invention is achieved by providing a mold for skin covered foamed plastic molding, comprising: a lower mold having a molding surface, where a skin cover is to be placed over the molding surface, and where liquid foam resin is to be poured onto the skin cover; an upper mold to be closed over the lower mold; and a middle mold to be placed between the upper mold and the lower mold, having means for reducing pressure exerted by the liquid foam resin falling on the skin cover.

Other features and the advantages of the present invention will become apparent from the following description taken in conjunction with the accompanying drawings.

DETAILED DESCRIPTION OF THE PREFERRED EMBODIMENTS

Figure 1:
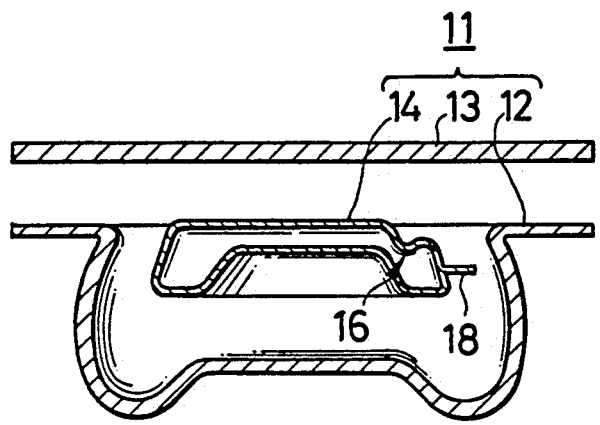
FIG. 1 is a cross sectional view of one embodiment of a mold for skin covered foamed plastic molding according to the present invention.

Referring now to FIG. 1, there is shown one embodiment of a mold for skin covered foamed plastic molding according to the present invention.

In this embodiment, a mold 11 comprises a lower mold 12, an upper mold 13 to be placed on top of the lower mold 12, and a middle mold 14 to be inserted between the lower mold 12 and the upper mold 13. All of the lower mold 12, the upper mold 13, and the middle mold 14 of the mold 11 can be made of aluminum or metal plate.

The middle mold 14 has a deposit area 16 with concave cross sectional shape on one of its upper side portions, in which the liquid foam resin is to be temporarily detained, and a receiving plate 18 protruding on the same side portion below the deposit area 16, which receives the foam resin flowing out from the deposit area 16.

Referring now to FIGS. 2 to 5, the molding process using this mold 11 will be explainded.

Figure 2:
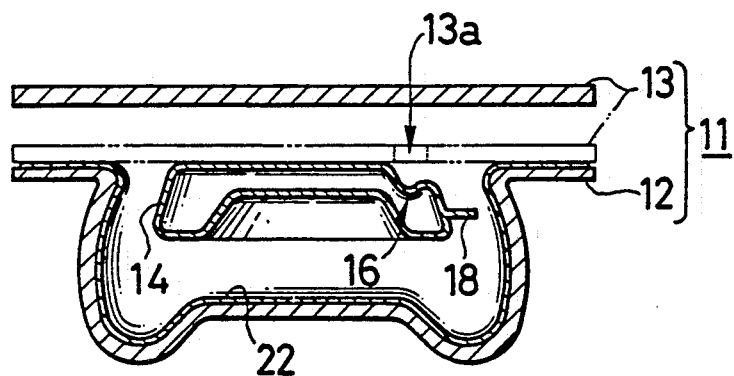
FIG. 2 and FIG. 3 are cross sectional views of the mold for skin covered foamed plastic molding of FIG. 1 for explaining molding using this mold.

First, as shown in FIG. 2, a skin cover 22 is placed over a molding surface of the lower mold 12. Then, the upper mold 13 and the middle mold 14 are placed in a predetermined mutual position. Here, the upper mold 13 may be one having a foam resin injection hole 13a, or alternatively one without a hole which is to be placed on top of the lower mold 12 after the foam resin is filled.

Figure 3:
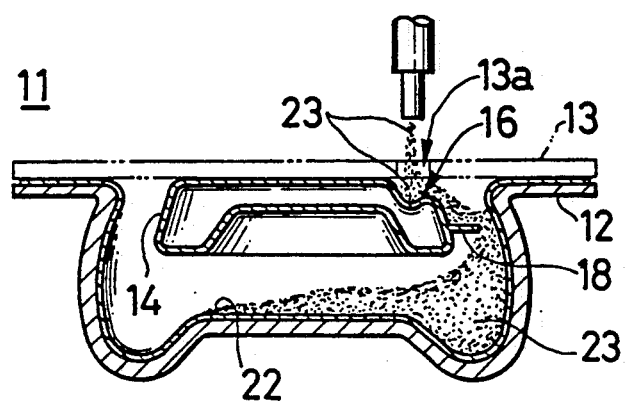
Figure 4:
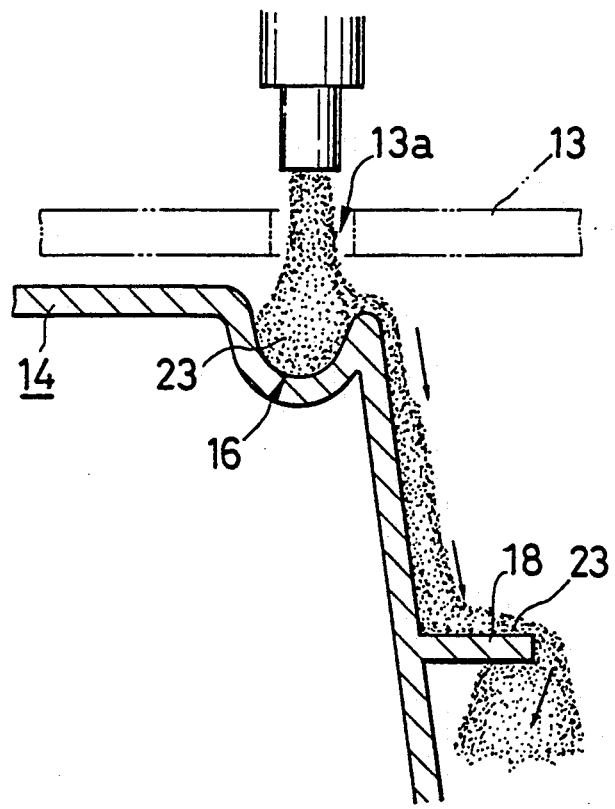
FIG. 4 is a partial magnified cross sectional view of the mold for skin covered foamed plastic molding of FIG. 1 for explaining the molding process using this mold in detail.

Next, as shown in FIG. 3, the foam resin 23 is poured in, and here the injection of the foam resin 23 is done such that the poured foam resin 23 falls on the deposit area 16 of the middle mold 14. As a result, the foam resin 23 is temporarily detained in the deposit area 16 first and then flows out of the deposit area 16, while undergoing a foaming process. As best shown in FIG. 4 the foam resin 23 then flows on top of the receiving plate 18 with further process in its foaming process. Consequently, the pressure exerted by the foam resin 23 falling from the receiving plate 18 on the skin cover 22 is much reduced by the time the foam resin 23 finally falls on the skin cover 22.

Figure 5:
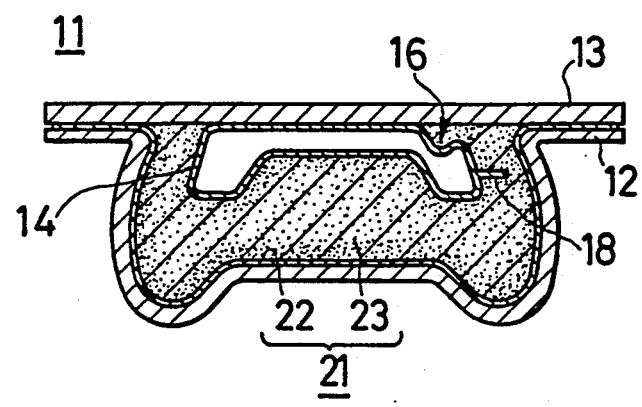
FIG. 5 is another cross sectional view of the mold for skin covered foamed plastic molding of FIG. 1 for explaining the molding process using this mold.

Finally, as shown in FIG. 5, after the foaming process of the foam resin 23 is completed, the upper mold 13 is opened and the middle mold 14 is removed from the foam resin 23, so that a skin covered foamed plastic article 21 composed of the skin cover 22 and the foam resin 23 can be lifted out of the lower mold 12. It is to be noted that the shapes and the sizes of the deposit area 16 and the receiving plate 18 may be suitably modified in various ways, and also that these can be incorporated as parts of the middle mold 14 as in the above embodiment, or alternatively be provided as separate elements to be attached on the middle mold 14.

Figure 6:
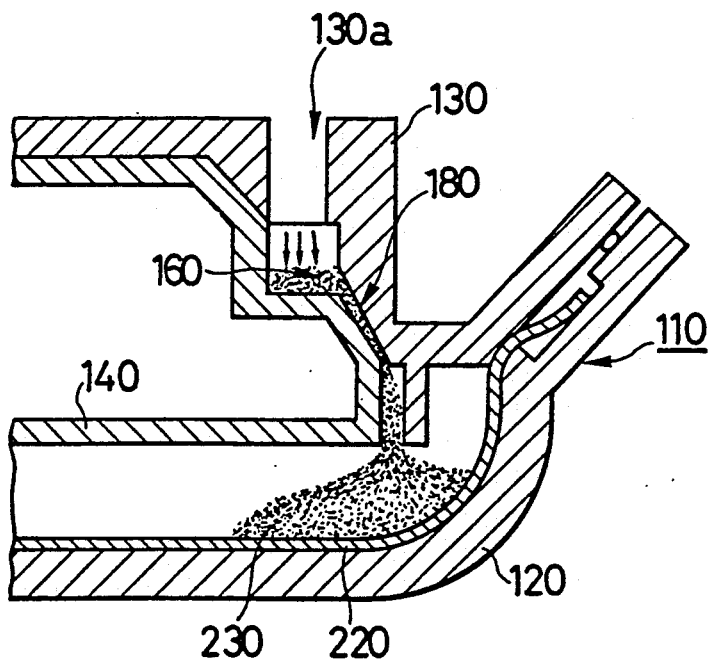
FIG. 6 is a partial magnified cross sectional view of another embodiment of a mold for skin covered foamed plastic molding according to the present invention for explaining the molding process using this mold.

Referring now to FIG. 6, another embodiment of a mold for skin covered foamed plastic molding according to the present invention will be described.

In FIG. 6, only an upper right portion of the mold according to this second embodiment, which differs from the first embodiment, is shown. The general overview of this mold is similar to that of the first embodiment shown in FIG. 1.

In this second embodiment, a mold 110 comprises a lower mold 120, an upper mold 130 to be placed on top of the lower mold 120, and a middle mold 140 to be inserted between the lower mold 120 and the upper mold 130, as in the first embodiment described above. Again, all of the lower mold 120, the upper mold 130, and the middle mold 140 of the mold 110 can be made of aluminum or metal plate.

In this second embodiment, there is a receiving area 160 with flat cross sectional shape provided on one of the upper side portions of the middle mold 140 directly below the foam resin injection hole 130a of the upper mold 130, which receives the liquid foam resin 230 poured from the foam resin injection hole 130a. In addition, on the same side portion below the receiving area 160, there is a narrow injection path 180 formed between the upper mold 130 and the middle mold 140, through which the foam resin 230 from the receiving area 160 flows down onto the skin cover 220 placed on the lower mold 120.

Figure 7:
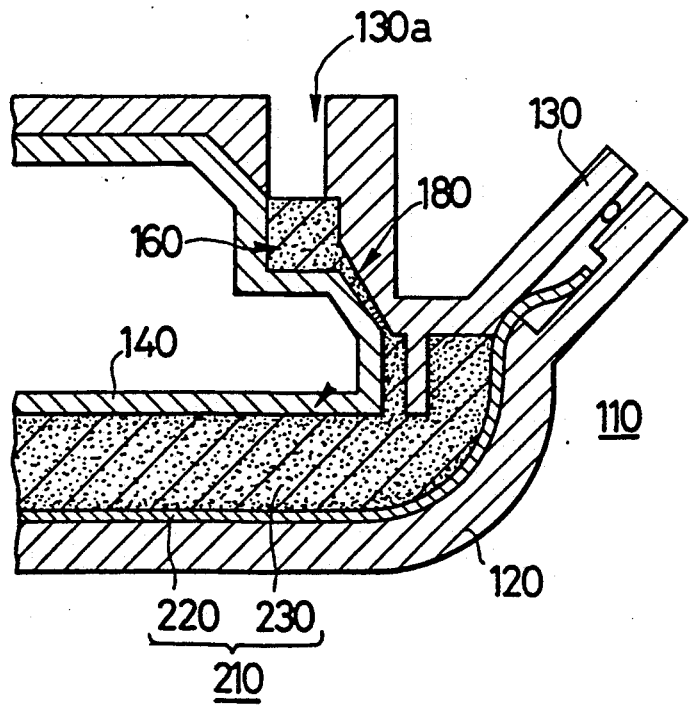
FIG. 7 is another partial magnified cross sectional view of the mold for skin covered foamed plastic molding of FIG. 6 for explaining the molding process using this mold.

Referring now to FIG. 7 in addition to FIG. 6, the molding process using this mold 110 will be explained.

First, a skin cover 220 is placed over a molding surface of the lower mold 120, and then the upper mold 130 and the middle mold 140 are placed in a predetermined mutual position.

Next, the foam resin 230 is poured in, and here the injection of the foam resin 230 is done such that the poured foam resin 230 falls on the receiving area 160 of the middle mold 140, as shown in FIG. 6. As a result, the foam resin 230 is temporarily detained in the receiving area 160 first, and then flows out of the receiving area 160 through the narrow injection path 180, which undergoing a foaming process. Consequently, the pressure exerted by the foam resin 230 falling through the injection path 180 on the skin cover 220 is much reduced by the time the foam resin 230 finally falls on the skin cover 220.

Finally, after the foaming process of the foam resin 230 is completed as shown in FIG. 7, the upper mold 130 is opened and the middle mold 140 is removed from the foam resin 230, so that a skin covered foamed plastic article 210 composed of the skin cover 220 and the foam resin 230 can be lifted out of the lower mold 120.

It is to be noted that the shapes and the sizes of the receiving area 160 and the injection path 180 may be suitably modified in various ways, and also that these can be incorporated as parts of the middle mold 140 as in the above embodiment, or alternatively be provided as separate elements to be attached on the middle mold 140.

As explained, according to the present invention, it is possible to provide a mold for skin covered formed plastic molding which utilizes a middle mold to be placed between an upper mold and a lower mold, capable of preventing penetration of the skin cover by the liquid foam resin to be poured onto the skin cover, and also capable of improving the efficiency of the manufacturing process, because the mold itself incorporates the structure to reduce the pressure exerted by the foam resin falling on the skin cover by the time the foam resin finally falls on the skin cover.

It is to be pointed out that apart from those mentioned above, many modifications and variations of the above embodiments may be made without departing from the novel and advantageous features of the present invention. Accordingly, all such modifications and variations are intended to be incorporated within the scope of the appended claims.

What is claimed is:

1. A mold for skin covered foamed plastic molding, comprising:
   a lower mold having a molding surface onto which a skin cover is to be placed, so that a liquid foam resin can be poured onto the skin cover;
   an upper mold to be closed over the lower mold; and
   a middle mold to be placed between the upper mold and the lower mold, and having means for reducing pressure exterted by the liquid foam resin on the skin cover.

2. The mold of claim 1, wherein the reducing means comprises a deposit area on an upper side portion of the middle mold, onto which the liquid foam resin is to be poured.

3. The mold of claim 2, wherein the deposit area has a concave cross sectional shape.

4. The mold of claim 2, wherein the middle mold further includes a receiving plate disposed adjacent to and protruding from the side portion below the deposit area, for receiving the liquid foam resin flowing out from the deposit area before the liquid foam resin falls onto the skin cover.

5. The mold of claim 1, wherein the reducing means comprises a receiving area on an upper side portion of the middle mold, onto which the liquid foam resin is to be poured, and wherein the upper mold and the middle mold form a narrow injection path below the receiving area, through which the liquid foam resin from the receiving area flows down onto the skin cover.

6. The mold of claim 5, wherein the receiving area has a flat cross sectional shape.

* * * * *